Patented Aug. 9, 1949

2,478,299

UNITED STATES PATENT OFFICE 2,478,299

PURIFICATION OF HYDROCARBON MIXTURES CONTAINING OLEFINS AND DIOLEFINS

Samuel Aaron Miller, Spondon, near Derby, England, assignor to Celanese Corporation of America, a corporation of Delaware No Drawing. Application June 26, 1946, Serial No. 679,567. In Great Britain July 11, 1945

5 Claims. (Cl. 260—468)

This invention relates to a process for the manufacture of certain valuable esters of cyclic dicarboxylic acids and to the application of this process to the removal of conjugated diolefines (i. e. diolefines containing conjugated olefinic double bonds) from mixtures containing them.

In the production of normally gaseous or low-boiling normally liquid reactive hydrocarbons by the cracking of higher-boiling hydrocarbons, there are usually obtained complex mixtures containing saturated hydrocarbons, olefines, diolefines and acetylenic hydrocarbons. Such mixtures can, up to a certain point, be separated into their constituents by fractional distillation, but in most cases it is not practicable in this way to isolate any particular hydrocarbon from other hydrocarbons containing the same number of carbon atoms. For example it is possible, by fractionally distilling under pressure the cracking products as a whole, to obtain a mixture containing only hydrocarbons having 4 carbon atoms in the molecule such as the isomeric butanes and butylenes, 1:3-butadiene (referred to hereinafter simply as "butadiene") and ethyl-acetylene; but it is not practicable to isolate either the valuable butadiene or any of the other constituents of the mixture by this method.

Butadiene can be removed from such a mixture for example by reaction with sulphur dioxide to form butadiene sulphone, and this method affords a useful means of obtaining in a pure state the greater part of the butadiene originally contained in the mixture. It is, however, not possible to remove all the butadiene from the mixture in this way, except by repeating the operation several times, and this would be expensive and inconvenient. In practice it is not feasible to obtain in this way mixtures containing less than about 5% or 6% of butadiene.

We have now found that conjugated diolefines react with certain unsaturated esters to give valuable esters of cyclic dicarboxylic acids and that this reaction readily takes place even when the diolefine is diluted with a very large proportion of other compounds, e. g. other hydrocarbons, and can therefore be used for removing diolefines even from mixtures containing for example less than about 8% thereof.

In accordance with the invention a conjugated diolefine is heated with a di-ester of maleic acid or a substituted maleic acid. The diolefine and the di-ester of maleic acid or a substituted maleic acid combine to form a di-ester of tetrahydrophthalic acid or a substituted tetrahydrophthalic acid. For example, in one important application of the invention, butadiene is heated with a dialkyl maleate to produce a di-alkyl tetrahydrophthalate. The di-esters of tetrahydrophthalic acid and substituted tetrahydrophthalic acids are valuable plasticisers and high boiling solvents, for example for cellulose esters and ethers and for polyvinyl esters, e. g. polyvinyl chloride and polyvinyl acetate.

The diolefine employed in the reaction may be substantially pure, but as already indicated it is one of the advantages of the invention that the diolefine may be employed in admixture with other compounds, in particular other hydrocarbons, even when the proportion of diolefine in the mixture is very low, for example less than 8% or even less than 5%.

The reaction is preferably carried out by bringing the diolefine or the mixture containing it into contact with more than an equimolecular amount of the di-ester of maleic acid or a substituted maleic acid at a temperature above 80° C. and under a pressure sufficient to keep the diolefine in the liquid phase. The diolefine may with advantage be brought into contact with at least 1.5 molecular equivalents of the di-ester and preferably with more than this, for example with between 2.5 and 6 molecular equivalents.

During the reaction, the temperature of the reactants is preferably maintained above 100° C. and especially between about 120° C. and 140° C. The pressure needed to keep the diolefine in the liquid phase naturally depends on the particular diolefine and the temperature employed. For example when butadiene is being caused to react with the di-ester at 120-130 C. the pressure needed is about 330-360 lbs. per sq. in.

One valuable application of the invention is the removal of butadiene from admixture with other hydrocarbons containing 4 carbon atoms by heating the hydrocarbon mixture with dibutyl maleate, the butadiene reacting with the dibutyl maleate to give dibutyl tetrahydrophthalate. In place of dibutyl maleate, however, other esters of maleic acid may be used, e. g. the dimethyl, diethyl, dipropyl, di-isopropyl, di-hexyl, di-octyl, di-lauryl, di-cyclohexyl, di-(ethyl-hexyl) and di-(methoxy-ethyl) esters, or if desired mixed esters. Esters of substituted maleic acids, e. g. citraconic acid, pyrocinchonic acid or diphenyl-maleic acid, may be used instead of maleates.

The invention may also be applied to the separation of conjugated diolefines other than butadiene, e. g. isoprene, 2:3-dimethyl butadiene, and cyclic diolefines such as cyclopentadiene and 1:3-cyclohexadiene, from mixtures containing them, and to the manufacture from these diolefines and di-esters of maleic acid and substituted maleic acids of the corresponding di-esters of substituted tetrahydrophthalic acids. It is thus evident that the new process makes it possible to obtain a wide variety of such esters by making use of various conjugated diolefines, and of the esters of maleic acid and substituted maleic acid with various alcohols.

The invention is illustrated by the following example:

*Example*

From a hydrocarbon mixture containing the isomeric butanes and butylenes, a little ethylacetylene and 5.4% of butadiene (obtained by fractionating the cracking products of a Pennsylvanian gas oil and removing from the $C_4$ fraction the greater part of its butadiene content by reaction with sulphur dioxide) most of the butadiene is removed and converted into dibutyl tetrahydrophthalate by the following process:

Dibutyl maleate in amount about 4.5 times the molecular equivalent of the amount of butadiene contained in the hydrocarbon mixture is introduced into a vessel capable of withstanding a pressure of 400 or 500 lbs. per. sq. in., and the hydrocarbon mixture is then forced into the vessel under a pressure such that the butadiene is in the liquid phase. The vessel is then closed and the temperature raised to 130° C. When the reaction is substantially complete the temperature is allowed to fall and the pressure is then released. The escaping gases contain the butanes, butylenes and ethylacetylene of the original mixture, but only about 1% of butadiene. Thus more than four fifths of the butadiene present in the initial mixture of hydrocarbons has been removed.

The contents of the reaction vessel, after the release of the pressure and the escape of the unreacted gases therefrom, consist largely of unchanged dibutyl maleate mixed with dibutyl tetrahydrophthalate, and these compounds can easily be separated by fractional distillation under reduced pressure. The dibutyl maleate is then available for re-use. The dibutyl tetrahydrophthalate may if desired be further purified, e. g. by again fractionally distilling it under reduced pressure. It has valuable properties as a plasticizer, especially for cellulose derivatives, e. g. cellulose acetate, and for polyvinyl compounds, e. g. polyvinyl chloride and polyvinyl acetate.

In the process described in this example the dibutyl maleate may be replaced by another di-ester of maleic acid or by a di-ester of citraconic acid, pyrocinchonic acid or diphenyl-maleic acid. Moreover hydrocarbon mixtures containing other conjugated diolefines may be subjected to reaction with dibutyl maleate or other esters of maleic acid or with esters of citraconic acid, pyrocinchonic acid or diphenyl-maleic acid under substantially the same conditions.

Having described my invention, what I desire to secure by Letters Patent is:

1. Process for removing a conjugated diolefine from a hydrocarbon mixture containing it, which comprises first reducing the diolefine content of the mixture to less than 8% by causing part of the diolefine to react with sulphur dioxide and separating the sulphone so formed, then heating the resulting hydrocarbon mixture to a temperature above 80° C. under a pressure such that the diolefine is in the liquid phase with at least 1.5 molecular equivalents (for each molecular equivalent of the diolefine remaining in the mixture) of a compound selected from the group which consist of di-esters of maleic acid and di-esters of alkyl- and aryl-substituted maleic acids, and separating the unreacted hydrocarbons from the reaction mixture.

2. Process for removing a conjugated diolefine from a hydrocarbon mixture containing it, which comprises first reducing the diolefine content of the mixture to less than 8% by causing part of the diolefine to react with sulphur dioxide and separating the sulphone so formed, then heating the resulting hydrocarbon mixture to a temperature of 120 to 140° C. under a pressure such that the diolefine is in the liquid phase with 2.5–6 molecular equivalents (for each molecular equivalent of diolefine in the mixture) of a compound selected from the group which consists of di-esters of maleic acid and di-esters of alkyl- and aryl-substituted maleic acids, and separating the unreacted hydrocarbons from the reaction mixture.

3. Process for removing 1:3-butadiene from a hydrocarbon mixture containing it, which comprises first reducing the butadiene content of the mixture to 5–8% by causing part of the butadiene to react with sulphur dioxide and separating the sulphone so formed, then heating the resulting hydrocarbon mixture to a temperature above 80° C. under a pressure such that the butadiene is in the liquid phase with at least 1.5 molecular equivalents (for each molecular equivalent of the butadiene in the mixture) of a compound selected from the group which consists of di-esters of maleic acid and di-ester of alkyl- and aryl-substituted maleic acids, and separating the unreacted hydrocarbons from the reaction mixture.

4. Process for removing 1:3-butadiene from a hydrocarbon mixture containing it, which comprises first reducing the butadiene content of the mixture to 5–8% by causing part of the butadiene to react with sulphur dioxide in a single stage and separating the sulphone so formed, then heating the resulting hydrocarbon mixture to a temperature of 120–140° C. under a pressure such that the butadiene is in the liquid phase with 2.5–6 molecular equivalents (for each molecular equivalents (for each molecular equivalent of the butadiene in the mixture) of a di-alkyl maleate, and separating the unreacted hydrocarbons from the reaction mixture.

5. Process for removing 1:3-butadiene from a hydrocarbon mixture containing it, which comprises first reducing the butadiene content of the mixture to 5–8% by causing part of the butadiene to react with sulphur dioxide in a single stage and separating the sulphone so formed, and then heating the resulting hydrocarbon mixture to a temperature of 120–140° C. under a pressure such that the butadiene is in the liquid phase with 2.5–6 molecular equivalents (for each molecular equivalent of the butadiene in the mixture) of dibutyl maleate.

SAMUEL AARON MILLER.

REFERENCES CITED

The following references are of record in the file of this patent:

UNITED STATES PATENTS

| Number | Name | Date |
|---|---|---|
| 1,824,068 | Brooks et al. | Sept. 22, 1931 |
| 1,993,681 | Perkins | Mar. 5, 1935 |
| 2,262,002 | Hopff | Nov. 11, 1941 |
| 2,358,048 | Bitler et al. | Sept. 12, 1944 |

OTHER REFERENCES

Petroleum, vol. 35 (1939), pages 567–573, Grosze-Oetringhaus.

Certificate of Correction

Patent No. 2,478,299                                            August 9, 1949

SAMUEL AARON MILLER

It is hereby certified that errors appear in the printed specification of the above numbered patent requiring correction as follows:

Column 2, line 17, for "80% C." read *80° C.*; line 31, for "120–130 C." read *120–130° C.*; column 4, lines 42 and 43, strike out "(for each molecular equivalents";

and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*